(12) United States Patent
Carnegie et al.

(10) Patent No.: US 6,402,024 B1
(45) Date of Patent: Jun. 11, 2002

(54) MACHINE OPERABLE BY A CARD CARRYING DATA

(75) Inventors: Steven A. Carnegie, Perthshire; Bryan D. Sturrock; Kenneth J. Peters, both of Dundee, all of (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/259,118

(22) Filed: Feb. 26, 1999

(30) Foreign Application Priority Data

Apr. 14, 1998 (GB) .............................................. 9807634

(51) Int. Cl.$^7$ .............................................. G06K 17/60
(52) U.S. Cl. ........................ 235/379; 235/380; 235/381; 235/486; 705/43
(58) Field of Search ................................ 235/379, 380, 235/492, 493, 381, 486; 705/43

(56) References Cited

U.S. PATENT DOCUMENTS

| 3,758,121 | A | * | 9/1973 | Walsh | 274/4 E |
|---|---|---|---|---|---|
| 4,914,279 | A | | 4/1990 | Massey | 235/449 |
| 5,135,095 | A | * | 8/1992 | Kocznar et al. | 235/380 |
| 5,559,317 | A | | 9/1996 | Wong et al. | 235/449 |
| 5,796,083 | A | * | 8/1998 | Kenneth et al. | 235/380 |
| 5,828,043 | A | * | 10/1998 | Nicoll et al. | 235/380 |
| 5,949,046 | A | * | 9/1999 | Kenneth et al. | 235/380 |
| 5,967,810 | A | | 10/1999 | Spickler et al. | 439/159 |

FOREIGN PATENT DOCUMENTS

| CH | 677411 | | 4/1990 |
|---|---|---|---|
| DE | CH677411 | A5 * | 5/1991 |
| EP | 0159530 | | 10/1985 |

\* cited by examiner

Primary Examiner—Karl D. Frech
Assistant Examiner—Uyen-Chau Le
(74) Attorney, Agent, or Firm—Francis L. Conte

(57) ABSTRACT

This invention relates to an electrically powered machine 10, for example, a card operated self service terminal (SST) and an automated teller machine (ATM). Such machines, in addition to necessary electronic circuitry and computer process controls, include means to receive a card (120), a reader (30) for reading data stored on the card, a display screen (14), a keyboard pad (16) and, in the case of an ATM a cash delivery slot (20). In the event of power failure during a customer transaction, the customer's card, for example, a bank card is captured by the machine when power is subsequently restored. Capture of a card is inconvenient to a customer. In order to overcome such inconvenience, it has been proposed to equip such a machine with a battery back-up system operable on power failure to return the card to the customer. A battery back-up system is expensive and accordingly a machine according to the present invention uses a device for mechanically stored energy during normal operation of the machine and means for using the stored energy in the event of power failure to discharge the card (120) from the machine.

15 Claims, 3 Drawing Sheets

MACHINE OPERABLE BY A CARD CARRYING DATA

BACKGROUND OF THE INVENTION

This invention relates to a machine operable by a card carrying data. The data may be magnetic, for example authorization data for use with a self-service financial terminal (SST) such as an automated teller machine (ATM) or may be data on a semi-conductor chip bearing "Smart Card". Such cards are usually made from plastics material.

ATMs possess function controls to dispense cash, accept cash, accept cheques, issue receipts and issue bank statements as well as accept bills for payment. SSTs fulfill similar functions but do not deal with cash; an SST may dispense tickets or maps or pre-paid cards such as telephone cards.

Generally speaking, in addition to necessary electronic circuitry and computer processor control, an ATM comprises a magnetic card input slot, a display screen, a keyboard pad and a cash delivery slot.

In the event of power failure during a customer transaction, the customer's card is captured by the machine when power is subsequently restored. Capture of a card in such circumstances is inconvenient to a customer since it may be several days before the card is returned by secure mail. It is also inconvenient if a customer is required to collect the captured card or a replacement card in person with the necessity to prove identity.

To overcome such customer inconvenience, a battery back-up system has been included, within an ATM or an SST, the system operating on power failure to return the card to the customer. Such a system is, however, expensive to the manufacturer and, consequently, to the customer to whom the expense is naturally passed.

SUMMARY OF THE INVENTION

According to the present invention, an electrically powered machine operable by a card carrying stored data comprises means to receive a card, a card reader for reading the stored data, means to produce an output signal, and ejection means for ejecting a card from the machine characterized by a device for mechanically storing energy during operation of the machine and means for using the so-stored energy in the event of electrical power failure to activate the ejection means to discharge the card from the machine.

Preferably, the means for mechanically storing energy is a clockwork mechanism including a spring which is wound up during operation, for example acceptance and/or ejection of customer cards and includes an overload relief device to safeguard against overloads and resulting excessive strain on the mechanism. The overload relief device may be a slipping clutch to prevent the mechanism from overwinding. The mechanism may include a solenoid which would be permanently energized so as to prevent the mechanism from unwinding. In the event of power failure, the solenoid would return to an unenergized state to release the mechanically stored energy to operate the ejection means and thereby eject the card from the card reader.

The means for mechanically storing energy is preferably designed to operate on power failure irrespective of whether a card is present. In the event of power failure and following ejection of a card and also when the card reader would otherwise be in a condition to receive a card, a flap is operated to close the means to receive a card and prevent acceptance of further cards until power is restored.

When compared with a machine including a battery back-up system, a machine according to the present invention possesses the advantage that it is unnecessary to design the card reader with power failing sensor circuitry, nor is it necessary for the card reader to include sensor circuitry to determine if a card is present in the reader when the power fails. Further, as previously stated, there is no necessity for the machine to include expensive battery back-up.

BRIEF DESCRIPTION OF THE DRAWINGS

A machine in accordance with the present invention will now be described, by way of example, with reference to the accompanying drawings in which.

DETAILED DESCRIPTION

Figure 1:
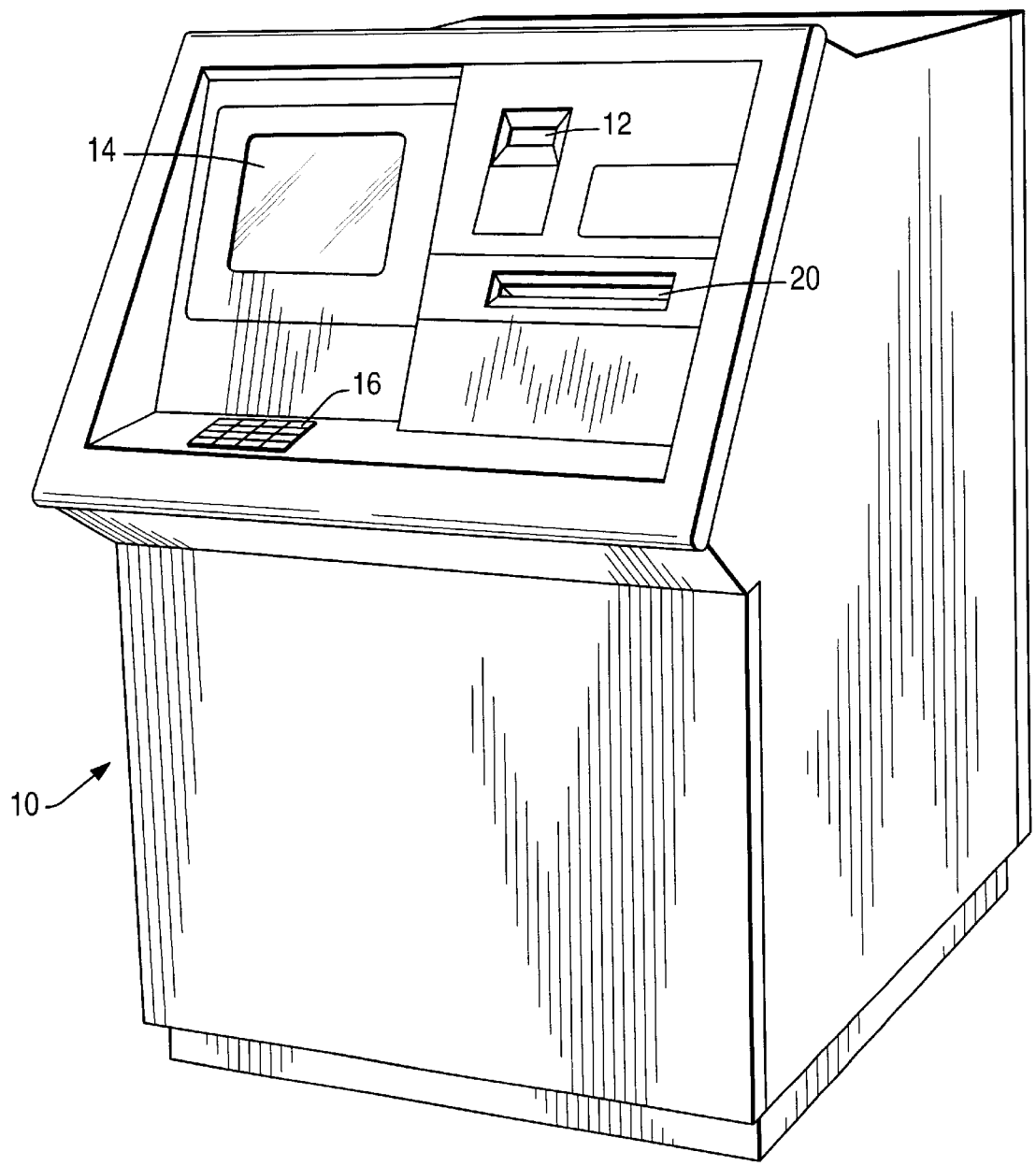
FIG. 1, is a perspective view of an ATM having a card reader and a cash dispensing slot.

FIG. 1 shows an ATM 10 having a magnetic card input slot 12, a display screen 14, a keypad 16 and a media dispensing slot 20 such as a cash delivery slot.

Figure 2:
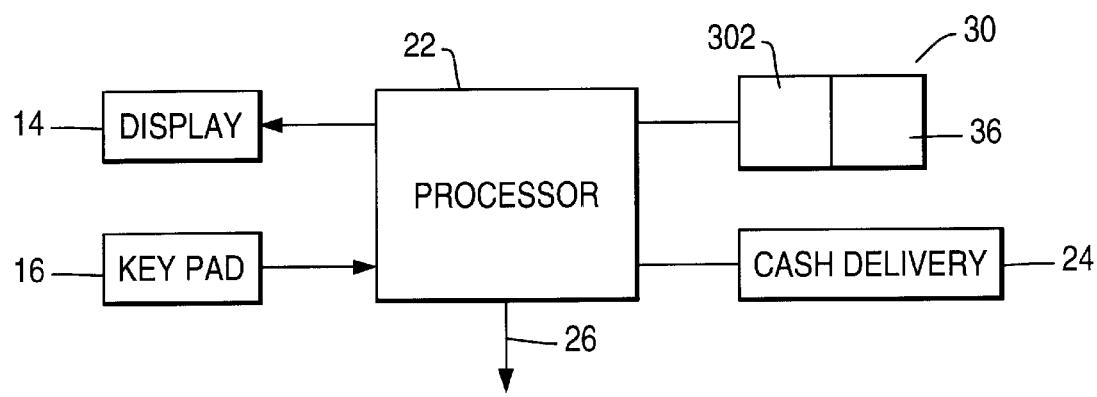
FIG. 2, is a block diagram of a control system for an ATM.

A control system for the ATM 10 is shown in FIG. 2, in which a processor 22 is connected to receive input from the keypad 16 to control the display 14 and to control a cash counting and delivery system 24 connected to the cash dispensing slot 20. The processor 22 is connected by a connection 26 to a central authorization system of the financial institution operating the ATM 10.

A card reader 30 is also connected to the processor 22, the card reader having a standard mechanical drive including a belt 302 to drive a card into and out of the reader 30, and a card damage detector 36.

Reference has previously been made to the fact that power failure during a transaction results in the capture of a customer's bank card 120 inserted through the input slot 12. The machine of the present invention includes a device for mechanically storing energy during normal operation of the machine and, in the event of power failure, the device activates the drive means and, hence the belt 302, to discharge the card from the machine for the customer to retrieve.

Figure 3:
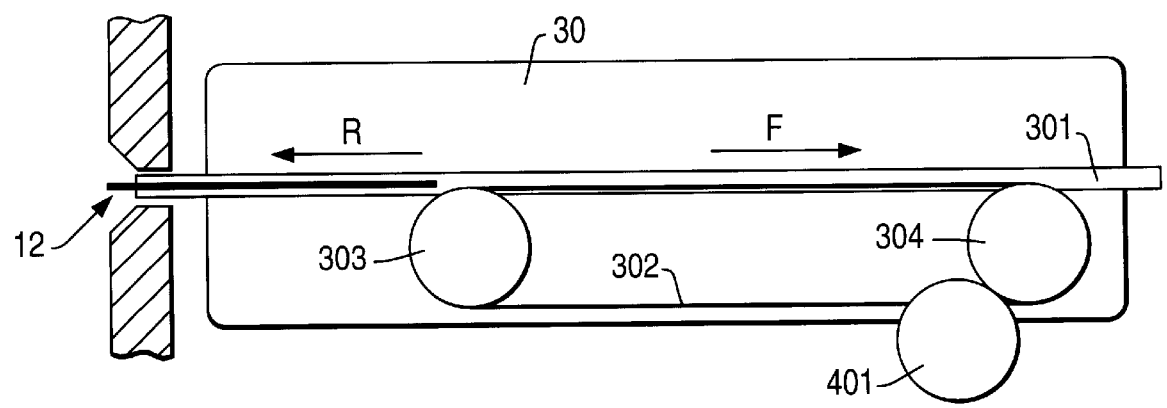
FIG. 3, is a diagrammatic section of a card reader.

The card reader 30 which is shown diagrammatically in FIG. 3 includes a pathway 301 for a customer's card and extends into the ATM from the magnetic card input slot 12. The card is moved into and out from the card reader 30 by the belt 302, in the form of a closed-looped transporter which passes over idler and driven drums 303 and 304 respectively. A conventional electric motor, not shown, drives the driven drum 304 when the card reader 30 receives a card. The pathway 301 for the card 120 is laterally defined by two longitudinally extending channel-shaped guides 305, 306 as shown in FIG. 4.

The device for mechanically storing energy is a conventional clockwork mechanism having a spiral spring 402 housed within a drum 401 which is in frictional driving contact with the drum 304. As shown in FIG. 4, the drum 401 is relieved at 405 to accommodate the transporter belt 302. The spiral spring 402 is wound-up to produce stored energy during normal operation of the ATM, by, for example, the ordinary acceptance and/or ejection of customer cards.

Figure 4:
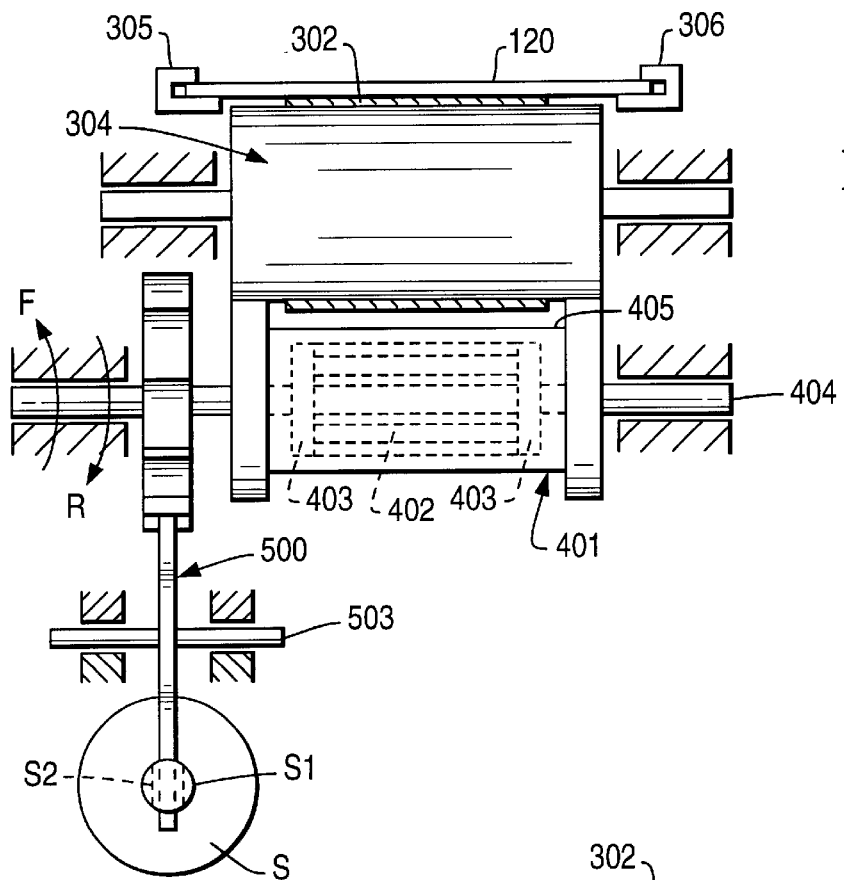
FIGS. 4 and 5 show in end and side view respectively a device for mechanically storing energy during normal operation of the ATM.
Figure 5:
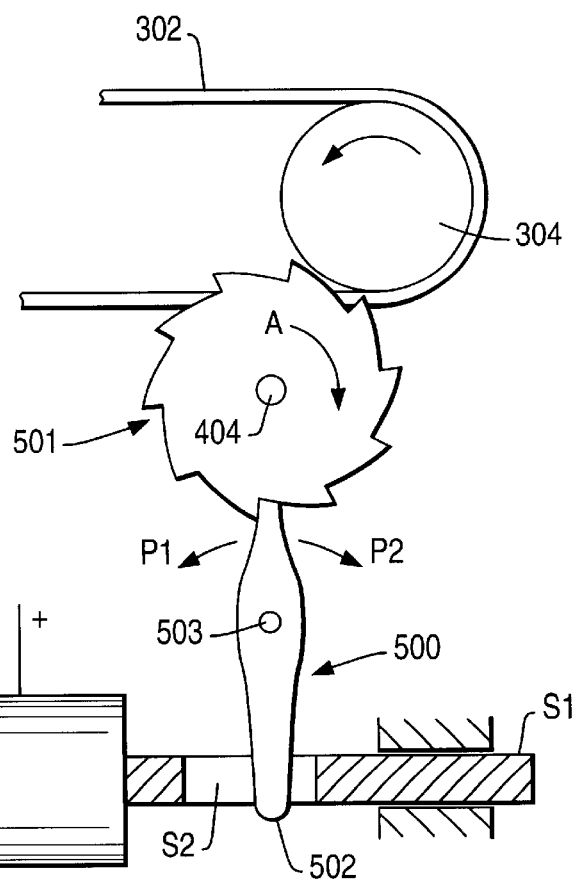

In the embodiment shown in FIGS. 3, 4 and 5, the spiral spring 402 is operatively attached to two free wheel devices 403 and shaft 404 so that the spring is wound up during forward movement of the belt 302 in the direction of arrow F. In order to produce a balanced winding and unwinding of the spring 402, a free wheel device 403 is disposed at opposite axial ends of the spring 402. The direction of arrow F also indicates the direction of travel of a card during acceptance thereof by the ATM.

Release of mechanical energy stored in the wound-up spiral spring 402 is governed by a pawl 500 and ratchet wheel 501 arrangement under the control of an electromagnetic solenoid S—see FIGS. 4 and 5. The ratchet wheel 501 is drivingly supported on the shaft 404 of the drum 401. The pawl and ratchet wheel 500/501 arrangement is operable to free-wheel in the direction of arrow A, unhindered by the pawl 500, during the time that the spiral spring 402 is wound-up. In order to prevent over-winding of the spiral spring 402, a slipping clutch, not shown, is mounted between the ratchet wheel 501 and the shaft 404 or at any convenient position on the shaft 404 between the drum 401 and the ratchet wheel 501.

The electromagnetic solenoid S has a plunger S1 and is powered by the electrical supply to the machine (ATM) in known manner. The plunger S1 is slotted at S2 to accommodate end 502 of the pawl 500 which is pivotally movable about axle 503. During movement of the ratchet wheel 501 in the direction of arrow A (i.e. during wind up the spiral spring 402), the pawl is angularly displaced slightly in the direction of arrow P2 (FIG. 5) against a biasing force not shown to allow the pawl 500 to trip over successive teeth of the ratchet wheel 501. The extent of the slot S2 is sufficient to allow such tripping of the pawl without contacting the solenoid plunger S1.

In operation of the ATM, the spiral spring 402 is wound-up during normal acceptance of a customer card and in the event that the spiral spring 402 is wound-up to full capacity, or preferably, a little less than full capacity, the slipping clutch, not shown but disposed between the ratchet wheel 501 and the shaft 404, prevents over-winding of the spiral spring 402. At all times during power-on to the machine (ATM), the solenoid S is energized and the plunger S1 is in the position shown in FIG. 5 to permit the pawl 500 to see-saw during the spring wind-up operation. On power failure, the solenoid is de-energized and the plunger S1 retracts to the left as viewed in FIG. 5, thereby urging in the pawl 500 in the direction of arrow P2 to release the energy in the wound-up spiral spring 402 and drive the drum 401 clockwise as viewed in FIG. 3. Since the drums 401 and 304 are in a frictional driving relationship, both the drum 304 and the belt 302 are driven anti-clockwise to eject any customer card which may be in the machine when power failed.

What is claimed is:

1. An electrically powered self-service terminal for allowing a user to carry out a transaction, the self-service terminal comprising:

means defining a slot through which a user card carrying stored data can be inserted by the user and through which the card can be ejected to return the card to the user;

a reader for reading the stored data carried on the card;

drive means for (i) accepting the card when the user inserts the card through the slot to begin carrying out the transaction, and (ii) ejecting the card through the slot to return the card to the user when the transaction is carried out;

means for mechanically storing energy during operation of the self-service terminal comprising a clockwork mechanism including a spring which is wound-up during operation of the self-service terminal; and means for releasing the stored energy to activate the drive means to eject the card through the slot to return the card to the user if an electrical power failure occurs.

2. A self-service terminal according to claim 1, further comprising a slipping clutch operatively connected in a drive line between the spring and the drive means to prevent the spring from over-winding.

3. A self-service terminal according to claim 1, further comprising a free-wheel device operable in a free wheel mode during wind-up of the spring.

4. A self-service terminal according to claim 3, wherein the spring is wound-up during acceptance of the user card.

5. A self-service terminal according to claim 3, further comprising a solenoid operable to release the free wheel device and thereby the stored energy if an electrical power failure occurs.

6. A self-service terminal according to claim 1, wherein the stored data is magnetic.

7. An electrically powered automated teller machine (ATM) for allowing an ATM customer to carry out a financial transaction, the ATM comprising:

means defining a slot through which an ATM customer card carrying stored data can be inserted by the ATM customer and through which the card can be ejected to return the card to the ATM customer;

a reader for reading the stored data carried on the card;

drive means for (i) accepting the card when the ATM customer inserts the card through the slot to begin carrying out the transaction, and (ii) ejecting the card through the slot to return the card to the ATM customer when the transaction is carried out;

means for mechanically storing energy during operation of the ATM comprising a clockwork mechanism including a spring which is wound-up during operation of the ATM; and means for releasing the stored energy to activate the drive means to eject the card through the slot to return the card to the ATM customer if an electrical power failure occurs.

8. An ATM according to claim 7, further comprising a slipping clutch operatively connected in a drive line between the spring and the drive means to prevent the spring from over-winding.

9. An ATM according to claim 7, further comprising a free-wheel device operable in a free wheel mode during wind-up of the spring.

10. An ATM according to claim 9, wherein the spring is wound-up during acceptance of the ATM customer card.

11. An ATM according to claim 9, further comprising a solenoid operable to release the free wheel device and thereby the stored energy if an electrical power failure occurs.

12. An ATM according to claim 7, wherein the stored data is magnetic.

13. A self-service terminal comprising:

a slot for receiving a user card;

a reader for reading said card:

electrically powered means for transporting said card between said slot and said reader; and means for ejecting said card through said slot upon failure of electrical power to said transporting means comprising a spring drum disposed in frictional contact with said transporting means for mechanically storing energy therefrom during operation thereof, and including a spiral spring housed therein.

14. A terminal according to claim 13 wherein said ejecting means further comprise means for automatically releasing said stored energy from said spring drum to mechanically power said transporting means during said power failure to eject said card through said slot.

15. A terminal according to claim 14 wherein:

said transporting means include a belt supported over idler and driven drums;

said spring drum is disposed in frictional contact with said driven drum; and said releasing means include a ratchet wheel joined to said spring drum, a pawl engaging said ratchet wheel, and a solenoid joined to said pawl for releasing said ratchet wheel during said power failure.

* * * * *